2,897,669

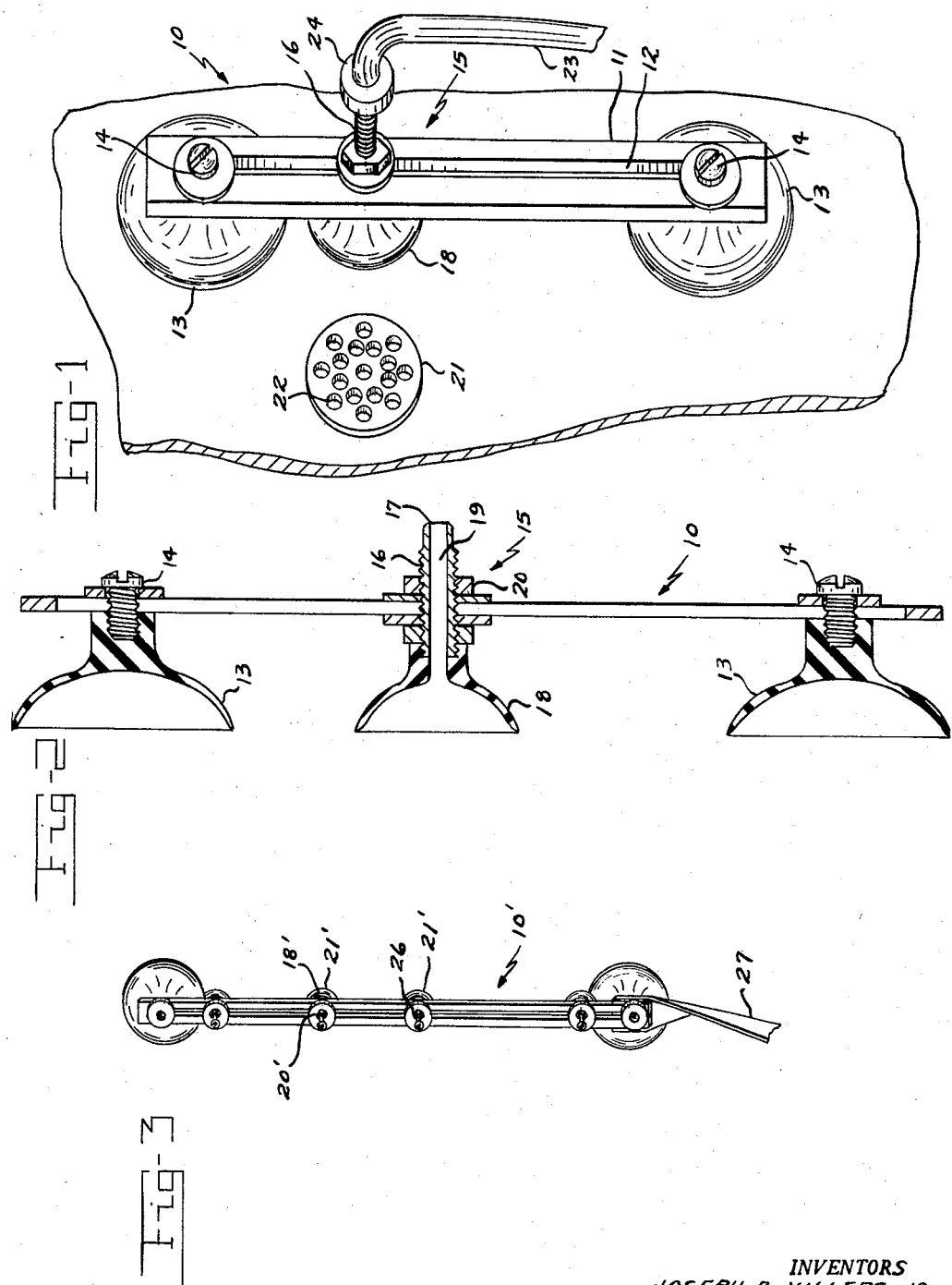

STATIC INSTRUMENT SYSTEM TEST ADAPTER

Joseph B. Villiers, Jr., Baltimore, Md., and Ronald E. Luck, Allen, Mich., assignors to the United States of America as represented by the Secretary of the Air Force Application March 15, 1957, Serial No. 646,508

5 Claims. (Cl. 73—4)

(Granted under Title 35, U.S. Code (1952), sec. 266)

The invention described herein may be manufactured and used by or for the United States Government for governmental purposes without payment to us of any royalty thereon.

The present invention relates to an aircraft static system test adapter for interchangeable use in securing and supporting the vacuum line of a static instrument tester to a static port of the flush mounted type and in further closing the opposite static port during test operation.

In conducting static pressure tests particularly wherein a static port is mounted flush with the fuselage of an aircraft, it has been found difficult in the past to obtain a rigid, sealing contact between the static instrument tester line and the static port. In securing connection between the vacuum line and the static instrument line it is necessary not only to provide adequate support for the vacuum line and a sealed connection into the static instrument system but also to make the vacuum line and securing means easily removable without damaging the static port and skin of the aircraft. It has been proposed to break into the line with a T fitting arrangement in order to prevent damage to the outer port; however, this is not feasible in that upon completion of the test it is necessary to repair the line with the consequent dangers that a leak may occur at the point of repair. It has also been proposed to utilize a harness which is slipped around the fuselage and includes an attachment fitting to hold the vacuum line in place over the static port. Although the harness or webbing arrangement can be effectively applied where there are no obstructions on the outer surface of the fuselage about the static port, it can not be effectively used where the static port is located in line with the wing structure or other projections.

In that the static instrument system includes static ports mounted on opposite sides of the fuselage, when performing a static instrument test on a chosen static port it is further necessary to block the opposite port in order to make a calibration or leakage test. In this respect it has been common to apply tape to the opposite static port when applying vacuum to the chosen static port. Unfortunately, it has been known to endanger the aircraft when the tape has been inadvertently left on during flight, and also to give false leak indication due to tape leakage. In addition, tape often causes damage to the aircraft surface paint and damage to the fitting as the result of repeated removal.

To obviate the foregoing difficulties and disadvantages in the present testing connections, it is the primary object of the present invention to provide a static system test adapter which can be interchangeably used to secure airtight communication between the vacuum line and static port and to close the opposite port against leakage.

It is another object to provide a static system test adapter for rigidly securing and supporting the vacuum line of a static tester into the static system without removal of the static instrument line.

It is another object to provide a static instrument system test adapter which is easily attachable and removable with adjustable securing and attaching means for conformity to various types of aircraft.

It is a further object to provide a compact, lightweight static system test adapter readily conformable and adjustable for application to all types and sizes of fuselage static ports.

It is still a further object to provide a static instrument test adapter which will insure complete system tests under simulated flight conditions and is easily removable without danger of damage to the aircraft.

In accordance with the foregoing objects and purposes of the present invention, the invention broadly teaches the use of a slotted support arrangement with adjustable hold-down means carried in the slotted portion to removably position the support with the slotted portion of the support in rigid, spaced relation over the flush mounted static port of an aircraft. The slot is aligned with the static port to accommodate an attachment fitting having an air passage therein for interconnecting the test hose line of the static tester and the static port with resilient means at the end of the fitting to establish airtight communication between the test hose and the static port, the fitting together with the hold-down means being adjustable both slidably and transversely in the slotted portion for adaptation to various sizes and types of flush mounted static ports. To close the opposite port, another adapter can be easily converted by closing the air passage in the fitting.

With the foregoing and other objects in view, which will be made manifest in the following detailed description and specifically pointed out in the appended claims, reference is had to the accompanying drawings for an illustrative embodiment of the invention, wherein:

Fig. 1 is a perspective view of the static system test adapter just prior to attachment to a flush mounted static port on the fuselage of an aircraft;

Fig. 2 is a vertical sectional view through the adapter connection; and

Fig. 3 is a perspective view illustrating the use of the adapter for closing the opposite static ports during calibration and leak tests.

In the preferred embodiment as set forth in Figs. 1 and 2, there is shown a static instrument system test adapter 10 composed of a guide support member or elongate bar 11 having an intermediate, slotted portion 12 extending through the thickness of the guide support 11 and substantially the length thereof with hold-down suction cups 13 adjustably carried at each end of the slotted portion by means of carriage bolts or studs 14. The hold-down cups 13 are mode slidable along the slotted portion and adjustable within the slot by clamping bolts 14 on each side of the slotted portion.

Positioned in the slotted portion between the end cups 13 is a test hose attachment fitting 15 made up of a tubular stud or body portion 16, with a test hose receiving nipple 17 at one end and a flexible sealing member or resilient means 18 at the opposite end. The sealing member is preferably formed of a flat, suction cup arrangement with a central opening for threaded engagement with the stud 16.

As shown in Fig. 2 an air passage 19 extends from the nipple through the tubular body portion and also the flexible sealing member 18. The tubular body portion 16 is adjustably clamped to the guide support 11 and on each side of the slotted portion 12 by means of tightener nuts 20. In this way, the attachment fitting is also slidable along the slotted portion 12 and transversely adjustable in the slot for tightening against a static port 21, provided with apertures 22.

In applying the test adapter 10 to the flush mounted port 21 the guide support member 11 is preferably vertically attached to the fuselage by pressing the hold-down cups 13 firmly against the surface with the slotted portion midway between the hold-down cups and aligned over the static port. The attachment fitting 15 is then pressed firmly into place so as to completely cover the port 21. It is to be noted that exact alignment of the slotted portion over the static port is not necessary due to the flexibility of the sealing member 18, although it is advisable to place as little strain as possible on the sealing member. The tubular body 16 is securely clamped in place by the tightener nuts 20 in such a way that the sealing member is slightly in compression against the static port in order to insure the most intimate sealing contact. A vacuum line 23 having a female mating member 24 for the nipple 17 is then slipped over the nipple and outer portion of the tubular body so as to make an airtight connection from the static tester (not shown) into the attachment fitting.

As illustrated in Fig. 3, the static system test adapter 10 which is shown in Figs. 1 and 2 can be easily converted into a test adapter port seal 10' for blocking off an opposite static port 21' during the leakage or calibration test. This is accomplished by removing the tubular stud portion 15 and replacing it with a solid stud 26 which is threaded into a solid, flexible sealing member 18' and clamped within the slotted portion in the same manner as the tubular body 16. The test adapter port seal is also connected to the fuselage in the same way as test adapter 10. The flexible sealing member 18' is then closed tightly over the static port 21' by tightener nuts 20'.

In a typical test arrangement wherein it is desired to test the altimeter static instrument line, the test adapter 10 is mounted over one port and a port seal adapter 10' over the opposite port to seal the entire line. Vacuum is applied to the line through the test adapter 10 to obtain a 1,000 feet reading on the altimeter. Any drop in pressure will then indicate system leakage in the line between the static ports. Of course the test adapters can also be applied to any other instrument utilizing static ports as a means of outside air or fluid entry into the line.

Upon completion of the testing operation and removal of the test hose, any suction between the sealing members 18 and static ports 21 can be relieved through the air passage, and the hold-down cups 13 are then easily removed either by breaking the suction seal or by providing a webbing 27 at one end of the guide support to free the hold-down cups.

Where double ports are used on opposed sides of the fuselage, or any multiple number of ports, the static instrument test adapter is uniquely adaptable to such a system in that any number of attachment fittings and port seal fittings can be used in the slotted portion to provide communication into one port and to block off the remaining ports. For instance, Fig. 3 illustrates the use of a plurality of port seal fittings to block off a number of static ports.

From the above description of the interchangeable test adapter, it will be readily appreciated that an improved device for securing and supporting a static tester hose to a flush static port is provided which can be easily connected, securely and rigidly positioned and easily removed after the test operation without damage to the static port or fuselage surface. The interchangeability of the adapter also permits its utilization as a port seal and for placement of a number of fittings where multiple static ports are mounted on the aircraft. In addition, it is compact, inexpensive and lightweight and is easily adaptable and adjustable for application and conformity to all types and sizes of static ports.

It is to be understood that various changes may be made in the details of construction and operation of the static instrument test adapter without departing from the scope of the invention as defined in the appended claims.

What is claimed:

1. An aircraft static system test adapter for securing and supporting the test hose of a static instrument tester in airtight relation with a static port, comprising: a bar member having an elongated continuous slotted portion extending therethrough, holding means to position the slotted portion in rigid, spaced relation over the static port including a pair of end suction clamp members adjustably mounted in said slotted portion in depending relation to said bar member, and a test hose attachment fitting having a slidably adjusted tubular body portion adjustably carried in said slotted portion between said end suction clamp members and having an air passage therethrough, said fitting adapted for attachment to the test hose at one end in spaced relation on one side of said body portion and having a flexible sealing member at the opposite end thereof in spaced relation on the other side of said body portion in surrounding, overlapping, suction-contact relation to the static port to establish airtight communication between said test hose and the static port.

2. An aircraft static system test adapter according to claim 1 in which clamping means are disposed on opposed sides of said bar member in engagement with said tubular body portion to clamp and lock said sealing member tightly against the static port.

3. An aircraft static system test adapter for securing a static tester or the like to a flush mounted static port comprising: a slotted support member, flexible suction sealing supports adjustably positioned at the opposite ends of said support member to retain the slotted portion of said support in superposed rigid, spaced relation over the port; and an adapter fitting adjustably carried in said slotted portion intermediate of said end supports for connection to one end of the vacuum line of the static tester, said adapter fitting including a flexible suction cup at the opposite end thereof in sealing contact between said fitting and said port, said fitting and said cup having an air passage therethrough to establish communication between the vacuum line and said port.

4. An aircraft static system test adapter for securing and supporting the test hose of a static instrument tester in airtight relation with a static port, comprising: an elongate bar having an intermediate slotted portion extending substantially the length thereof, end supporting members adjustably carried in said slotted portion to align said slotted portion in rigid, spaced relation over the static port adapted for mounting on the aircraft and constituting flexible, vacuum-sealed elements; an exteriorly threaded, test hose attachment fitting having a body portion with an air passage extending therethrough, said body portion further including a hose receiving end and a flexible hold-down cup at the opposite end thereof and means to adjustably secure said body portion to said bar to retain said flexible hold-down cup in airtight relation to the static port.

5. An aircraft static system test adapter for securing and supporting the test hose of a static instrument tester in airtight relation with a static port, comprising: an elongate bar member with an elongate slotted portion extending therethrough; at least one hold-down member at each end of the slotted portion, each hold-down member including a threaded stud member extending through said slotted portion, means to adjustably clamp said stud to said bar, and a suction cup at one end of said stud to secure said bar to the fuselage of an aircraft with the slotted portion in rigid, spaced relation over the static port; and at least one test hose attachment fitting having a threaded stud member extending through said slotted portion, said stud member including a hose receiving nipple at one end, a flexible sealing cup at the opposite end thereof for covering the static port, and adjustable tightening means on said stud to press said sealing cup into airtight, sealing contact with the static port.

References Cited in the file of this patent

UNITED STATES PATENTS

| | | |
|---|---|---|
| 2,106,407 | Hensley | Jan. 25, 1938 |
| 2,171,053 | White | Aug. 29, 1939 |
| 2,371,243 | Jordan | Mar. 13, 1945 |
| 2,752,914 | Pohlman | July 3, 1956 |

FOREIGN PATENTS

| | | |
|---|---|---|
| 522,089 | Germany | July 24, 1931 |